(12) United States Patent
Maneman

(10) Patent No.: US 11,016,725 B2
(45) Date of Patent: May 25, 2021

(54) SYSTEM AND METHOD CONNECTED TO A CASKET TO PLAY AUDIO FILE OVER A NETWORK

(71) Applicant: John Raymond Maneman, Albert City, IA (US)

(72) Inventor: John Raymond Maneman, Albert City, IA (US)

(\*) Notice: Subject to any disclaimer, the term of this patent is extended or adjusted under 35 U.S.C. 154(b) by 0 days.

(21) Appl. No.: 16/820,583

(22) Filed: Mar. 16, 2020

(65) Prior Publication Data
US 2020/0249906 A1 Aug. 6, 2020

Related U.S. Application Data

(60) Provisional application No. 62/823,617, filed on Mar. 25, 2019.

(51) Int. Cl.
| | | |
|---|---|---|
| *G06F 17/00* | (2019.01) | |
| *G06F 3/16* | (2006.01) | |
| *A61G 17/04* | (2006.01) | |
| *H02J 1/04* | (2006.01) | |

(52) U.S. Cl.
CPC ............. *G06F 3/165* (2013.01); *A61G 17/04* (2013.01); *G06F 3/167* (2013.01); *H02J 1/04* (2013.01); *H02J 2300/24* (2020.01)

(58) Field of Classification Search
CPC .................................................... A61G 17/00
See application file for complete search history.

(56) References Cited

U.S. PATENT DOCUMENTS

| | | | | |
|---|---|---|---|---|
| 5,404,343 A | * | 4/1995 | Boggio | E04H 13/003 360/12 |
| 8,068,035 B1 | * | 11/2011 | Salcedo | E04H 13/003 340/691.1 |
| 9,226,059 B1 | * | 12/2015 | Knight | A61G 17/04 |
| 2003/0208890 A1 | * | 11/2003 | Kim | A62B 33/00 27/31 |
| 2010/0146752 A1 | * | 6/2010 | Dannenberg | A61G 17/04 27/2 |
| 2016/0234583 A1 | * | 8/2016 | Zamir | H04R 1/02 |

\* cited by examiner

*Primary Examiner* — Joseph Saunders, Jr.
(74) *Attorney, Agent, or Firm* — Barry Choobin; Patent 360

(57) ABSTRACT

The embodiments herein provide a system connected to a casket to play an audio file selected by a user. The system includes an above-ground unit arranged to lead down into the casket. The above-ground unit includes a wireless module, controller, first speakers, light-emitting devices (LEDs), solar panel, and second speakers. The wireless module establishes a wireless connection with a computing device of the user. The controller facilitates the user to initiate the wireless connection on receiving a push gesture through buttons. The first speakers are configured within an amplifier chassis to generate audio data corresponding to the audio file through the computing device. The LEDs indicate the power status of the system and the connection status of the wireless module. The solar panel generates direct current (DC) electricity. The second speakers generate the audio data corresponding to the audio file selected by the user through the computing device.

6 Claims, 8 Drawing Sheets

SYSTEM AND METHOD CONNECTED TO A CASKET TO PLAY AUDIO FILE OVER A NETWORK

CROSS-REFERENCE TO RELATED APPLICATIONS

The present application claims priority under 35 U.S.C. 119(e) from provisional patent application Ser. No. 62/823,617, entitled "Beddrock", filed on Mar. 25, 2019, the contents of which are herein incorporated by reference in its entirety.

BACKGROUND

Technical Field

The embodiments herein are generally related to music generating devices, in particular to a system connected to a casket to play an audio file selected by a user over a network.

Description of the Related Art

Music is universal and has been around since the beginning of time. Music is also relative and subjective but everybody loves music. It is common practice to use specific songs to mark or commemorate significant milestones and special occasions. When a member of a family passes away, the bereaved members fall in a feeling of deep sorrow for losing their beloved ones because it is very hard to share the love and moments with the deceased one. Especially couples, who often share a song that represents the night they met or a wedding anniversary.

Therefore, a need exists for a system and method for involving a sense of hearing and creating a way for users to continue sharing music with their loved ones even after their death.

Various attempts have been made to solve the problems which may be found in the related art but have thus far been unsuccessful. A need exists for a reliable system and method to avoid the above-mentioned problems.

The above-mentioned shortcomings, disadvantages, and problems are addressed herein and which will be understood by reading and studying the following specification.

OBJECTIVES OF THE EMBODIMENTS HEREIN

The primary object of the embodiments herein is to provide a system and method for playing an audio file selected by a user in a casket over a network.

Another object of the embodiments herein is to provide an above-ground audio device powered by solar energy and arranged to lead down into a casket and plays selected audio files.

Yet another object of the embodiments herein is to provide a system and method that involves a sense of hearing and creates a way for users to continue sharing music with their loved ones even after their death.

Yet another object of the embodiments herein is to provide a system and method to wirelessly and remotely play the audio files or music in the casket through the strategically placed speakers that provide peace of mind as well as potential reminiscence.

Yet another object of the embodiments herein to provide an above-ground unit that is water-proof with wireless transmission and receiving capabilities.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein provide a system and method for playing an audio file selected by a user in a casket over a network.

According to one embodiment herein, a system connected to a casket to play an audio file selected by a user over a network. The system includes an above-ground unit. The above-ground unit is arranged to lead down into the casket. The above-ground unit includes a wireless module, a controller, one or more first speakers, an amplifier chassis, one or more light-emitting devices (LEDs), a solar panel, a battery, a flex conduit, one or more electrical wires, and one or more second speakers. The wireless module is configured to establish a wireless connection with a computing device of the user. The controller is configured to facilitate the user to initiate the wireless connection on receiving a push gesture through one or more buttons placed on the controller. The first speakers are configured within the amplifier chassis to generate audio data corresponding to the audio file selected by the user through the computing device. The light-emitting devices (LEDs) are configured to indicate at least one of one or more power status of the system and connection status of the wireless module. The solar panel is configured to absorb photons produced by sunlight to generate direct current (DC) electricity. The battery is configured to store the direct current (DC) electricity generated by the solar panel and energizes the wireless module, the controller, the first speakers, and the light-emitting devices. The flex conduit is configured to enclose and protect the electrical wires providing the direct current (DC) electricity to the second speakers placed in the casket. The electrical wires are passed through a keyhole present in the above-ground unit to establish an electrical connection between the above-ground unit and the casket. The second speakers generate the audio data corresponding to the audio file selected by the user through the computing device.

According to one embodiment herein, the amplifier chassis includes a preset timer configured to stop the operation of the above-ground unit after a predefined duration and resets to allow the above-ground unit to be used again.

According to one embodiment herein, the above-ground unit includes a clear cover having at least two or more mating surfaces to protect and transparently displays the wireless module, the controller, the first speakers, the light-emitting devices, and the power button.

According to one embodiment herein, the above-ground unit includes a rubber gasket that is configured to fill space between the two or more mating surfaces of the clear cover to prevent water leakage from and into the clear cover while under compression.

According to one embodiment herein, the above-ground unit includes a power button configured to activate the battery to initiate the operation of the above-ground unit.

According to an embodiment herein, a method for playing an audio file selected by a user in a casket over a network. The method includes a step of arranging an above-ground unit to lead down into the casket. The method includes a step of establishing a wireless connection with a computing device of the user through a wireless module disposed within the above-ground unit. The method includes a step of facilitating the user for initiating the wireless connection on receiving a push gesture through one or more buttons placed on a controller disposed within the above-ground unit. The method includes a step of generating audio data corresponding to the audio file selected by the user through the computing device through one or more first speakers configured within an amplifier chassis. The amplifier chassis disposed within the above-ground unit. The method includes a step of indicating at least one of one or more power status of the system and connection status of the wireless module through one or more light-emitting devices (LEDs) disposed within the above-ground unit. The method includes a step of absorbing photons produced by sunlight for generating direct current (DC) electricity through a solar panel disposed within the above-ground unit. The method includes a step of storing the direct current (DC) electricity generated by the solar panel and energizing the wireless module, the controller, the first speakers, and the light-emitting devices through a battery. The method includes a step of enclosing and protecting one or more electrical wires providing the direct current (DC) electricity to one or more second speakers placed in the casket through a flex conduit, wherein the electrical wires pass through a keyhole present in the above-ground unit to establish an electrical connection between the above-ground unit and the casket. The method includes a step of generating the audio data corresponding to the audio file through one or more second speakers. The method includes a step of stopping an operation of the above-ground unit after a predefined duration through a preset timer configured within the amplifier chassis. The preset timer resets to allow the above-ground unit to be used again. The method includes a step of protecting and transparently displaying the wireless module, the controller, the first speakers, the light-emitting devices, and the power button through a clear cover having at least two or more mating surfaces. The method includes a step of filling space between the two or more mating surfaces of the clear cover for preventing water leakage from and into the clear cover while under compression through a rubber gasket. The method includes a step of activating the battery for initiating the operation of the above-ground unit through a power button disposed within the above-ground unit.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features, and advantages will occur to those skilled in the art from the following description of the preferred embodiment and the accompanying drawings in which.

Figure 1:
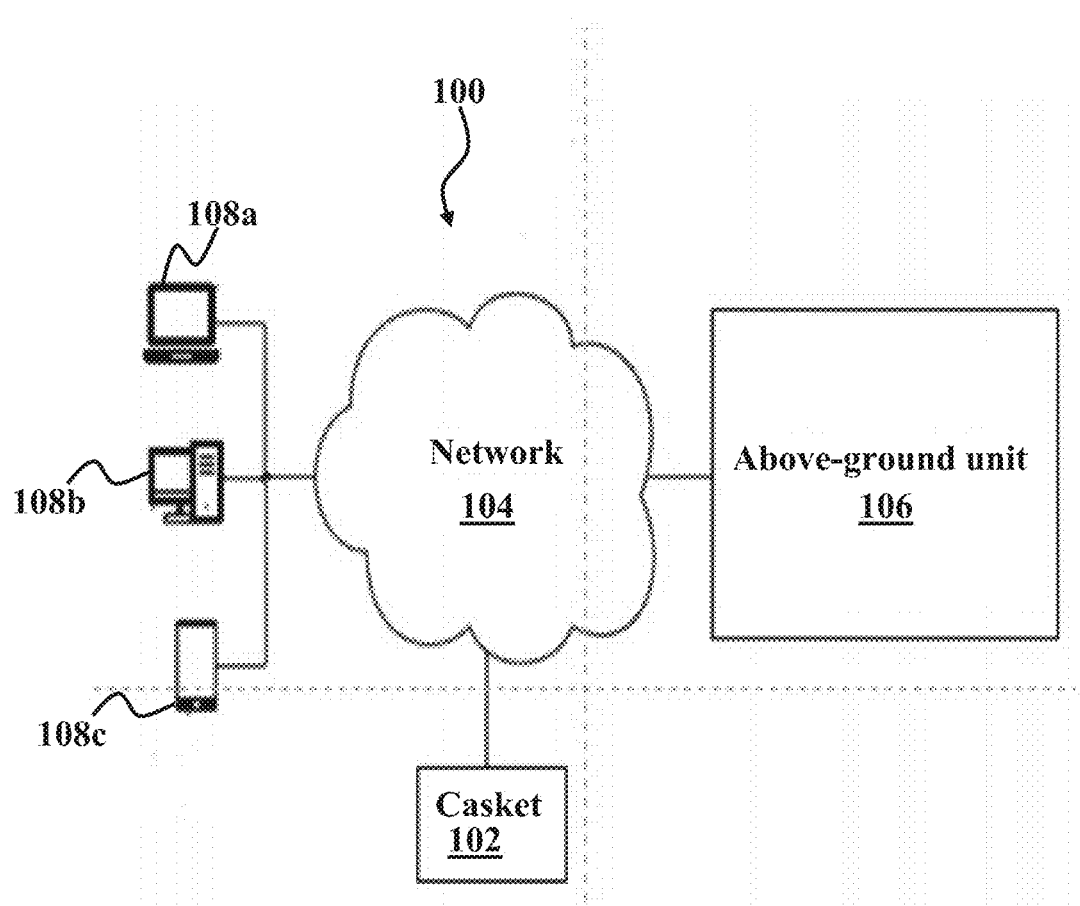
FIG. 1 illustrates a block diagram of the present system connected to a casket to play an audio file selected by a user over a network, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments of the present invention provide a system connected to a casket to play an audio file selected by a user over a network.

The embodiments herein provide a system and method for playing an audio file selected by a user in a casket over a network, whereby the system works by using solar energy converted to DC currents to operate the first speakers and second speakers (stereo system). The second speakers are strategically placed to provide peace of mind as well as potential reminiscence.

According to one embodiment herein, a system connected to a casket to play an audio file selected by a user over a network. The system includes an above-ground unit. The above-ground unit is arranged to lead down into the casket. The above-ground unit includes a wireless module, a controller, one or more first speakers, an amplifier chassis, one or more light-emitting devices (LEDs), a solar panel, a battery, a flex conduit, one or more electrical wires, and one or more second speakers. The wireless module is configured to establish a wireless connection with a computing device of the user. The controller is configured to facilitate the user to initiate the wireless connection on receiving a push gesture through one or more buttons placed on the controller. The first speakers are configured within the amplifier chassis to generate audio data corresponding to the audio file selected by the user through the computing device. The light-emitting devices (LEDs) are configured to indicate at least one of one or more power status of the system and connection status of the wireless module. The solar panel is configured to absorb photons produced by sunlight to generate direct current (DC) electricity. The battery is configured to store the direct current (DC) electricity generated by the solar panel and energizes the wireless module, the controller, the first speakers, and the light-emitting devices. The flex conduit is configured to enclose and protect the electrical wires providing the direct current (DC) electricity to the second speakers placed in the casket. The electrical wires are passed through a keyhole present in the above-ground unit to establish an electrical connection between the above-ground unit and the casket. The second speakers generate the audio data corresponding to the audio file selected by the user through the computing device.

According to one embodiment herein, the amplifier chassis includes a preset timer configured to stop the operation of the above-ground unit after a predefined duration and resets to allow the above-ground unit to be used again.

According to one embodiment herein, the above-ground unit includes a clear cover having at least two or more mating surfaces to protect and transparently displays the wireless module, the controller, the first speakers, the light-emitting devices, and the power button.

According to one embodiment herein, the above-ground unit includes a rubber gasket that is configured to fill space between the two or more mating surfaces of the clear cover to prevent water leakage from and into the clear cover while under compression.

According to one embodiment herein, the above-ground unit includes a power button configured to activate the battery to initiate the operation of the above-ground unit.

According to an embodiment herein, a method for playing an audio file selected by a user in a casket over a network. The method includes a step of arranging an above-ground unit to lead down into the casket, establishing a wireless connection with a computing device of the user through a wireless module disposed within the above-ground unit. The method includes a step of facilitating the user for initiating the wireless connection on receiving a push gesture through one or more buttons placed on a controller disposed within the above-ground unit. The method includes a step of generating audio data corresponding to the audio file selected by the user through the computing device through one or more first speakers configured within an amplifier chassis. The amplifier chassis disposed within the above-ground unit. The method includes a step of indicating at least one of one or more power status of the system and connection status of the wireless module through one or more light-emitting devices (LEDs) disposed within the above-ground unit. The method includes a step of absorbing photons produced by sunlight for generating direct current (DC) electricity through a solar panel disposed within the above-ground unit. The method includes a step of storing the direct current (DC) electricity generated by the solar panel and energizing the wireless module, the controller, the first speakers, and the light-emitting devices through a battery. The method includes a step of enclosing and protecting one or more electrical wires providing the direct current (DC) electricity to one or more second speakers placed in the casket through a flex conduit, wherein the electrical wires pass through a keyhole present in the above-ground unit to establish an electrical connection between the above-ground unit and the casket. The method includes a step of generating the audio data corresponding to the audio file through one or more second speakers. The method includes a step of stopping an operation of the above-ground unit after a predefined duration through a preset timer configured within the amplifier chassis. The preset timer resets to allow the above-ground unit to be used again. The method includes a step of protecting and transparently displaying the wireless module, the controller, the first speakers, the light-emitting devices, and the power button through a clear cover having at least two or more mating surfaces. The method includes a step of filling space between the two or more mating surfaces of the clear cover for preventing water leakage from and into the clear cover while under compression through a rubber gasket. The method includes a step of activating the battery for initiating the operation of the above-ground unit through a power button disposed within the above-ground unit.

FIG. 1 illustrates a block diagram 100 of the present system connected to a casket 102 to play an audio file selected by a user over a network 104, according to an embodiment herein. The system includes an above-ground unit 106. According to an embodiment herein, the network 104 is a wired or a wireless network, and the examples include but are not limited to the Bluetooth™, Internet, Wireless Local Area Network (WLAN), Wi-Fi, Long Term Evolution (LTE), Worldwide Interoperability for Microwave Access (WiMAX), and General Packet Radio Service (GPRS). The above-ground unit 106 is arranged to lead down into the casket 102. A user is a person who visits the cemetery or place of burial to remember the good times or share the current things going on in his/her life as well as their new favorite music. The casket 102 is occupied by a deceased person related to the user.

Figure 2:
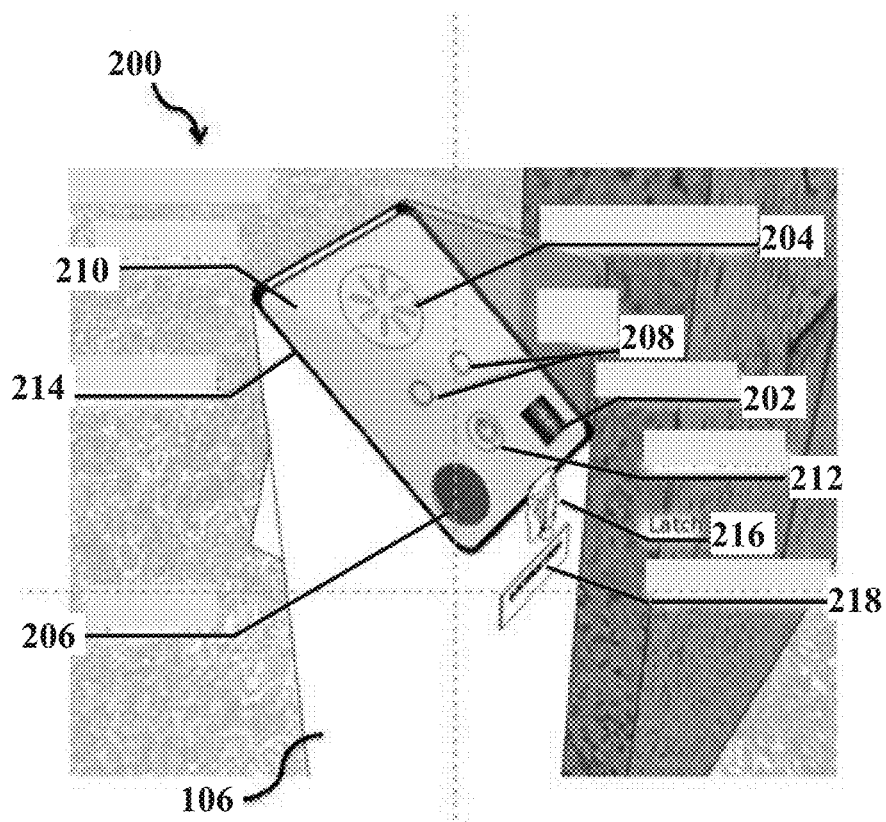
FIG. 2 illustrates a perspective view of various components of the above-ground unit, according to an embodiment herein.

FIG. 2 illustrates a perspective view 200 of various components of the above-ground unit 106, according to an embodiment herein. FIG. 2 is explained in conjunction with FIG. 1. The above-ground unit 106 includes a wireless module 202, a controller 204, one or more first speakers 206, an amplifier chassis (not shown in FIG. 2), one or more light-emitting devices (LEDs) 208, a solar panel 402 (shown in FIG. 4), a battery (not shown in FIG. 2), a flex conduit 502 (shown in FIG. 5), one or more electrical wires (not shown in FIG. 2), and one or more second speakers 602 (shown in FIG. 6). The wireless module 202 is configured to establish a wireless connection with a computing device 108a, 108b or 108c (shown in FIG. 1) of the user. Examples of the wireless module 202 include but not limited to a Bluetooth® module, Wi-Fi, or RFID. In an embodiment, the wireless module 202 enables the user to remotely operate the above-ground unit 106 and play the audio files from his/her home or any other places farther to or remote from the cemetery. Examples of the computing device 108 include but not limited to a laptop 108a, a desktop 108b, and a smartphone 108c operably connected over the network 104. Other examples of computing device 108 include but are not limited to a phablet and a tablet.

The controller 204 is configured to facilitate the user to initiate the wireless connection on receiving a push gesture through one or more buttons placed on the controller. The first speakers 206 are configured within the amplifier chassis to generate audio data corresponding to the audio file selected by the user through the computing device 108. Examples of the audio file including but not limited to a song, musical tunes, voice notes, audiobooks, etc. The audio data is emotions or message present in the audio file. In an embodiment, the amplifier chassis includes a preset timer configured to stop the operation of the above-ground unit after a predefined duration e.g. 30 minutes and resets to allow the above-ground unit 106 to be used again. The light-emitting devices (LEDs) 208 are configured to indicate at least one of one or more power status of the system and connection status of the wireless module 202.

In an embodiment, the above-ground unit 106 includes a clear cover 210 having at least two or more mating surfaces to protect and transparently displays the wireless module 202, the controller 204, the first speakers 206, the light-emitting devices 208, and the power button 212. In an embodiment, the above-ground unit 106 includes a rubber gasket 214 is configured to fill space between the two or more mating surfaces of the clear cover 210 to prevent water leakage from and into the clear cover 210 while under compression. In an embodiment, the above-ground unit 106 includes a power button 212 configured to activate the battery to initiate the operation of the above-ground unit 106.

In an embodiment, the above-ground unit 106 includes a latch 216 to enable the user to lock or integrate the components of the system into the above-ground unit 106. In an embodiment, the above-ground unit 106 includes an instruction label 218 to provide technical details to operate the above-ground unit 106.

Figure 3:
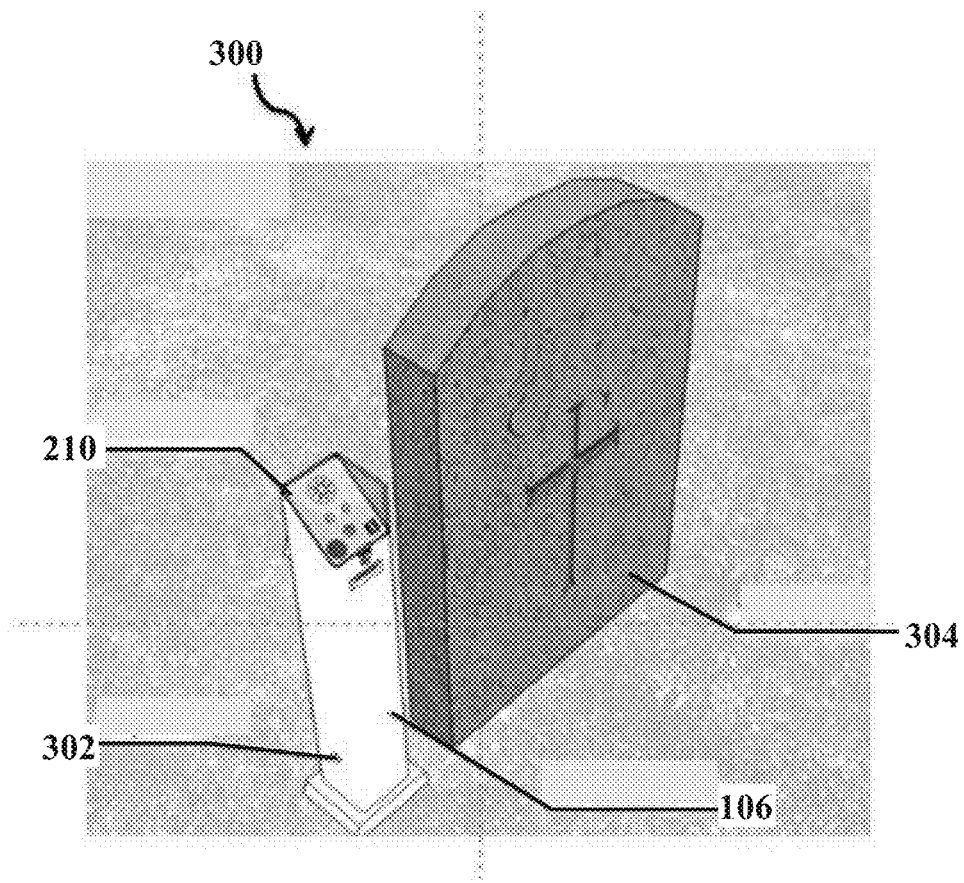
FIG. 3 illustrates a perspective view of the above-ground unit arranged to lead down into the casket, according to an embodiment herein.

FIG. 3 illustrates a perspective view 300 of the above-ground unit 106 arranged to lead down into the casket 102, according to an embodiment herein. FIG. 3 is explained in conjunction with FIG. 1. The above-ground unit 106 is installed near a tombstone 304. The electrical wires are passed through a keyhole 302 present in the above-ground unit 106 to establish an electrical connection between the above-ground unit 106 and the casket 102.

Figure 4:
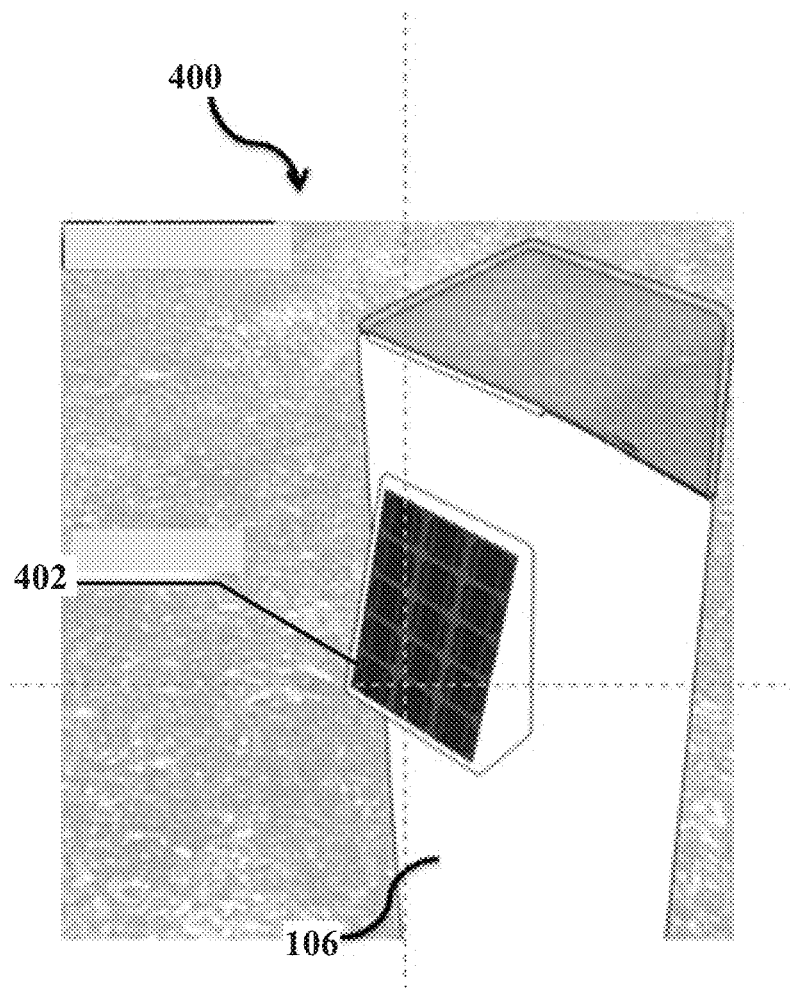
FIG. 4 illustrates a perspective view of the solar panel disposed within the above-ground unit, according to an embodiment herein.

FIG. 4 illustrates a perspective view 400 of the solar panel 402 disposed within the above-ground unit 106, according to an embodiment herein. FIG. 4 is explained in conjunction with FIG. 2. The solar panel 402 is configured to absorb photons produced by sunlight to generate direct current (DC) electricity. The battery is configured to store the direct current (DC) electricity generated by the solar panel 402 and energizes the wireless module 202, the controller 204, the first speakers 206, and the light-emitting devices 208. In an embodiment, the battery is a 12-volt battery power source such as a Lithium-ion battery or NiCad battery that is user-serviceable.

Figure 5:
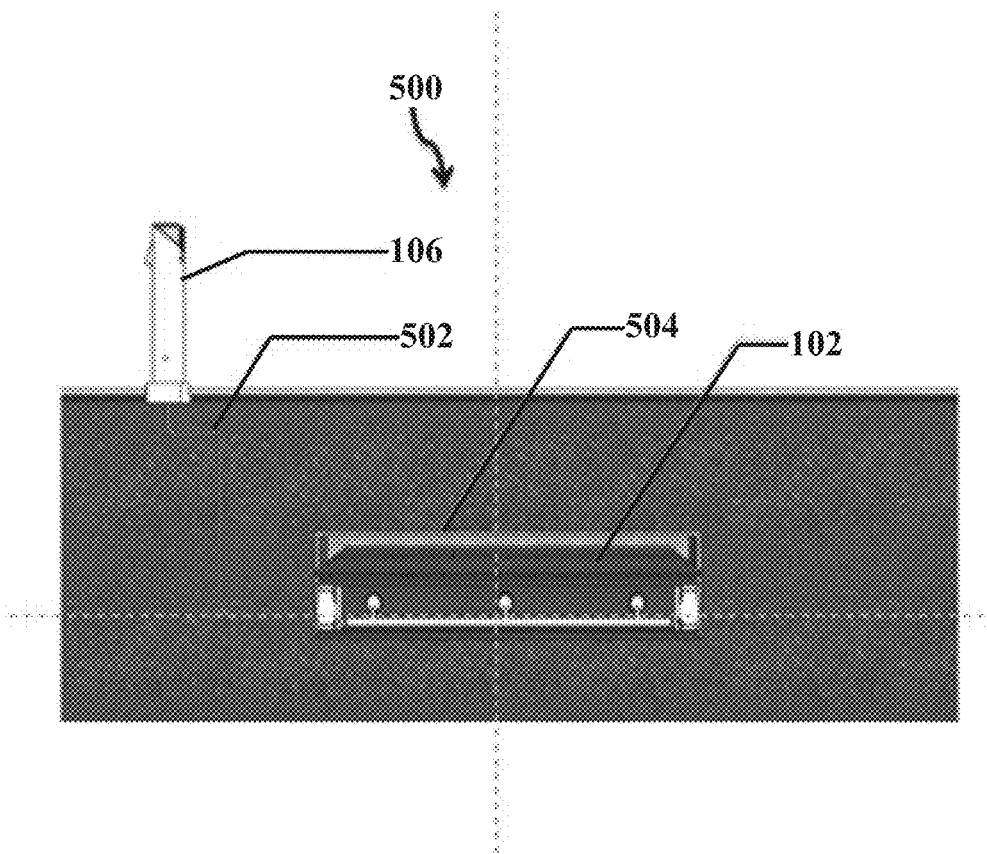
FIG. 5 illustrates a perspective view of the flex conduit reaches the casket via a vault, according to an embodiment herein.

FIG. 5 illustrates a perspective view 500 of the flex conduit 502 reaches the casket 102 via a vault 504, according to an embodiment herein. The flex conduit 502 is configured to enclose and protect the electrical wires providing the direct current (DC) electricity to the second speakers 602 placed in the casket 102. The flex conduit 502 is a flexible sealed connector pass via vault 504 to the casket 102. In an embodiment, the flex conduit 502 is removably attached or detachably attached to the casket 102. In an embodiment, the vault 504 has a seal-tight or seal proof connection and flex conduit 502 ran to the ground level where connections will be made to the controller 204. In an embodiment, the flex conduit 502 houses at least two plenum speaker cables that go down to a seal-tight or seal proof connector on the base surface of the casket 102 which then enters the casket 102 with afformed cables to be connected to the second speakers with a push-lock style connector. Thus a keyhole preferably of ¾ is drilled into the head of the casket 102 and allows a waterproof seal to two bar of pressure (30 psi) allowing waterproof stability to 15 meters underwater.

Figure 6:
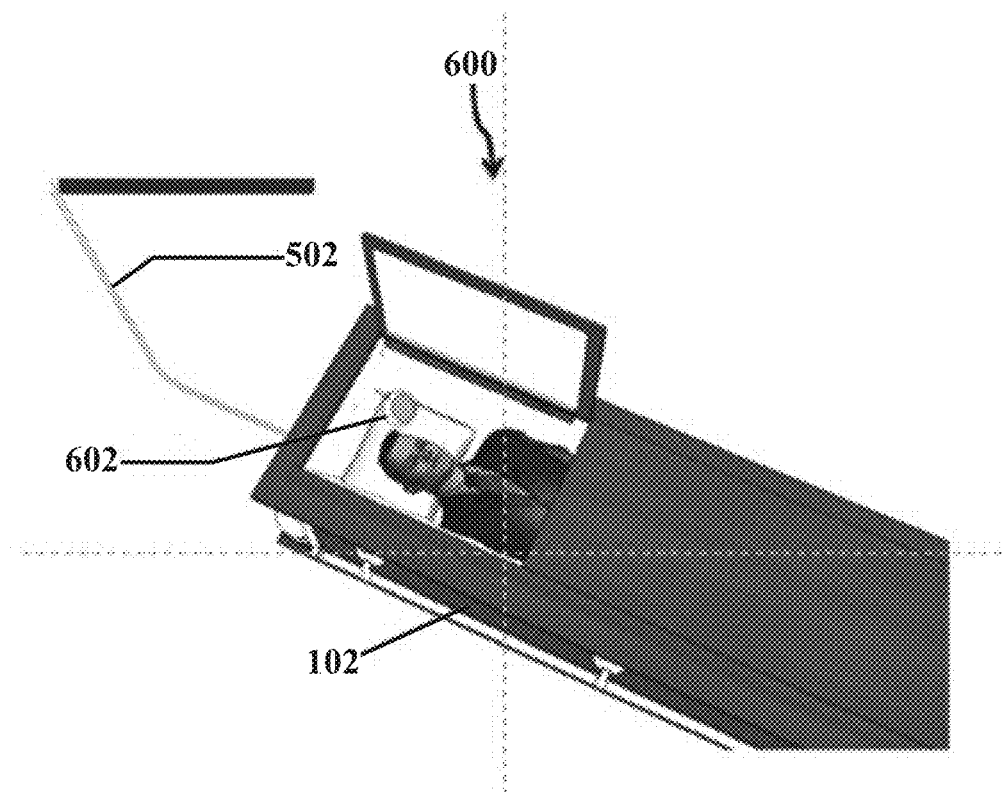
FIG. 6 illustrates a perspective view of the flex conduit to enclose and protect electrical wires providing the direct current (DC) electricity to one or more second speakers placed in the casket, according to an embodiment herein.

FIG. 6 illustrates a perspective view of the flex conduit to enclose and protect electrical wires providing the direct current (DC) electricity to one or more second speakers 602 placed in the casket 102, according to an embodiment herein. In an embodiment, the second speakers 602 and the first speakers 206 are marine grade speakers or stereo system. In an embodiment, the second speakers 602 are placed in above wing doors of the casket 102 and allow sound to fill the cabin. The second speakers 602 are wired with long-lasting plenum cabling and allow the connection of its wires with a waterproof termination connection.

Figure 7:
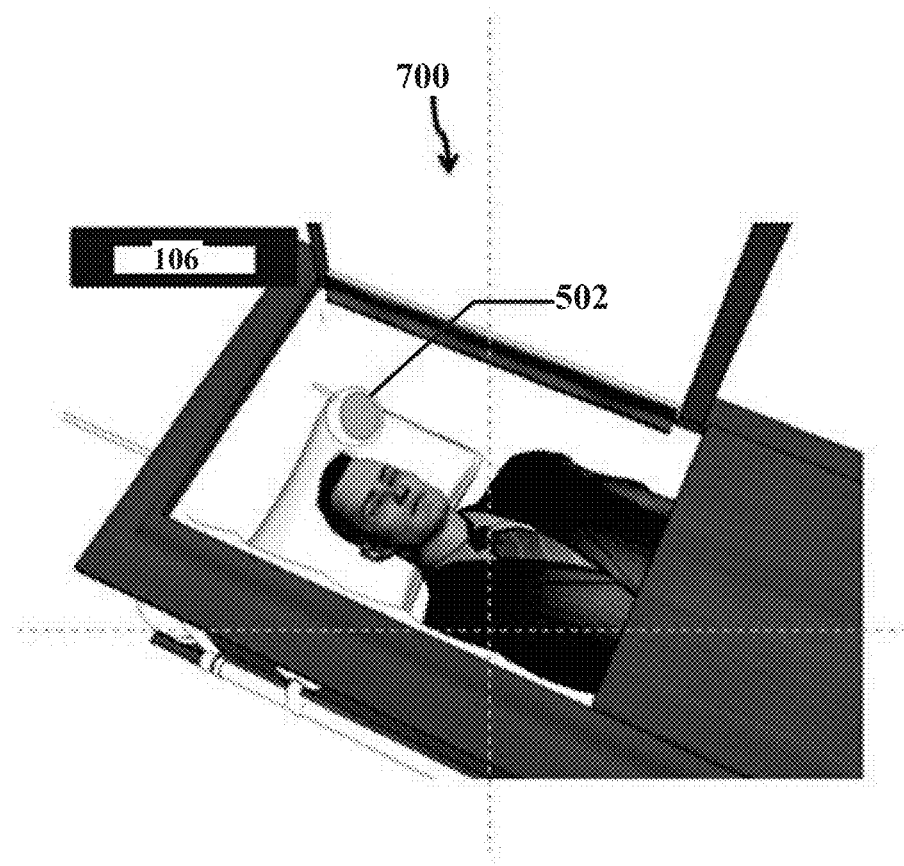
FIG. 7 illustrates a perspective view of the second speakers installed in the casket at either side or one side depending on requirements, according to an embodiment herein.

FIG. 7 illustrates a perspective view of the second speakers 602 installed in the casket 102 at either side or one side depending on requirements, according to an embodiment herein. The second speakers 602 generate the audio data corresponding to the audio file selected by the user through the computing device 108. In an embodiment, the electrical connections between the above-ground unit 106 and the casket 102 ensure that the water does not seep into the casket 102 via the lining provided for speaker connectors. The electrical connections are made with seal-tite connectors which are molded plastic connectors with rubber gasket.

Figure 8:
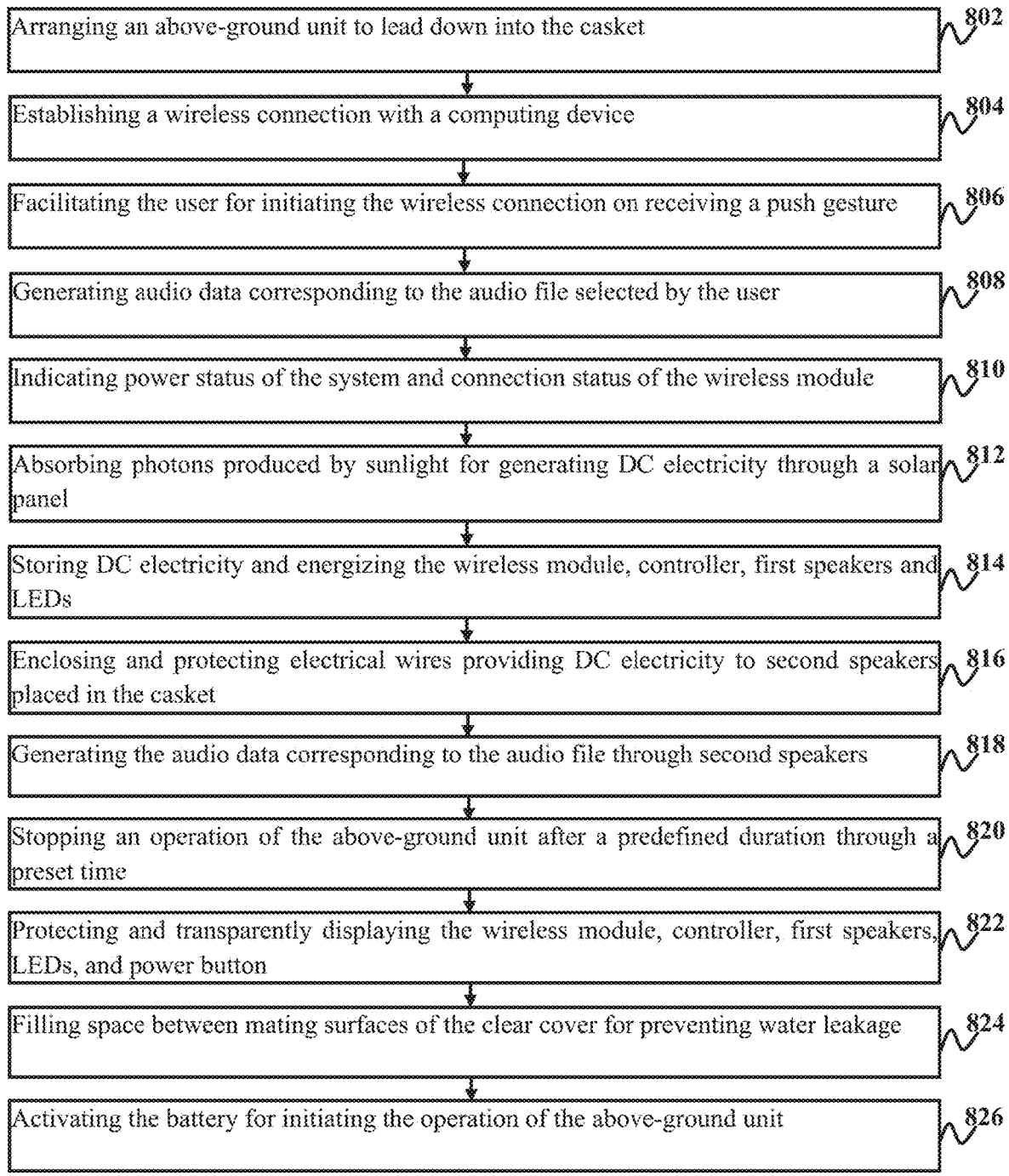
FIG. 8 illustrates a flowchart of the method for playing an audio file selected by a user in a casket over a network, according to an embodiment herein.

FIG. 8 illustrates a flowchart of the method for playing an audio file selected by a user in a casket over a network, according to an embodiment herein. The method includes a step 802 of arranging an above-ground unit to lead down into the casket. The method includes a step 804 of establishing a wireless connection with a computing device of the user through a wireless module disposed within the above-ground unit. The method includes a step 806 of facilitating the user for initiating the wireless connection on receiving a push gesture through one or more buttons placed on a controller disposed within the above-ground unit. The method includes a step 808 of generating audio data corresponding to the audio file selected by the user through the computing device through one or more first speakers configured within an amplifier chassis. The amplifier chassis disposed of within the above-ground unit. The method includes a step 810 of indicating at least one of one or more power status of the system and connection status of the wireless module through one or more light-emitting devices (LEDs) disposed within the above-ground unit. The method includes a step 812 of absorbing photons produced by sunlight for generating direct current (DC) electricity through a solar panel disposed within the above-ground unit. The method includes a step 814 of storing the direct current (DC) electricity generated by the solar panel and energizing the wireless module, the controller, the first speakers, and the light-emitting devices through a battery. The method includes a step 816 of enclosing and protecting one or more electrical wires providing the direct current (DC) electricity to one or more second speakers placed in the casket through a flex conduit. The electrical wires pass through a keyhole present in the above-ground unit to establish an electrical connection between the above-ground unit and the casket. The method includes a step 818 of generating the audio data corresponding to the audio file through one or more second speakers. The method includes a step 820 of stopping an operation of the above-ground unit after a predefined duration through a preset timer configured within the amplifier chassis. The preset timer resets to allow the above-ground unit to be used again. The method includes a step 822 of protecting and transparently displaying the wireless module, the controller, the first speakers, the light-emitting devices, and the power button through a clear cover having at least two or more mating surfaces. The method includes a step 824 of filling space between the two or more mating surfaces of the clear cover for preventing water leakage from and into the clear cover while under compression through a rubber gasket. The method includes a step 826 of activating the battery for initiating the operation of the above-ground unit through a power button disposed within the above-ground unit.

According to one embodiment herein, the present system and method provide various advantages to the users such as it maintains memories, offer a way to commemorate and remember important events with their loved one, provide a long-lasting connection, easy to set up, waterproof, and solar-powered.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system to play an audio file selected by a user in a casket, the system comprising:
   an above-ground unit communicably connected to the casket, wherein the above-ground unit comprises:
   an upstanding pillar having a sloped top;
   a transparent panel covering the top, the transparent panel secured to the pillar through a latch;
   a wireless module configured to establish a wireless connection with a computing device of the user, the wireless module mounted on the top of the pillar;
   a controller having a button, the button permits the user to initiate the wireless connection, the controller mounted on the top of the pillar;
   a first speaker provided within an amplifier chassis and configured to generate audio data corresponding to an audio file selected by the user through the computing device, the first speaker mounted on top of the pillar;
   one or more light-emitting devices configured to indicate at least one of a powered-on condition and a communication connection condition of the wireless module, the one or more light-emitting devices mounted on the top of the pillar;
   a solar panel to generate direct current (DC) for supplying electrical power, the solar panel mounted on a rear wall of the pillar; and
   a battery configured to store the direct current (DC) electricity generated by the solar panel to energize the wireless module, the controller, the first speaker, and the light-emitting devices;
   a flex conduit configured to enclose and protect one or more electrical wires supplying the direct current (DC) electricity, wherein the one or more electrical wires are passed through a keyhole in the pillar to establish an electrical connection between the above-ground unit and the casket;
   a second speaker mounted inside the casket and electrically connected to the one or more electrical wires.

2. The system according to claim 1, wherein the amplifier chassis comprises a preset timer configured to stop operation of the above-ground unit after a predefined duration and to reset the above-ground unit.

3. The system according to claim 1, wherein the wireless module, the controller, the first speaker, and the one or more light-emitting devices are visible through the transparent panel.

4. The system according to claim 1, wherein the above-ground unit comprises a rubber gasket surrounding a periphery of the transparent panel, the rubber gasket sealably sandwiched between the transparent panel and the top of the pillar.

5. The system according to claim 1, wherein the above-ground unit comprises a power button configured to activate the battery to initiate the operation of the above-ground unit.

6. The system according to claim 1, wherein the above-ground unit further comprises an instruction label affixed on a front wall of the pillar.

\* \* \* \* \*